United States Patent
Ohkuma

Patent Number: 5,872,511
Date of Patent: Feb. 16, 1999

[54] ELECTRONIC FLASHER SYSTEM

[75] Inventor: Sakae Ohkuma, Tokyo, Japan

[73] Assignee: Niles Parts Co., Ltd., Japan

[21] Appl. No.: 787,697

[22] Filed: Jan. 27, 1997

[30] Foreign Application Priority Data

| Apr. 18, 1996 | [JP] | Japan | 8-121021 |
| Apr. 18, 1996 | [JP] | Japan | 8-121022 |
| Apr. 18, 1996 | [JP] | Japan | 8-121023 |

[51] Int. Cl.$^6$ .................................................. B60Q 1/52
[52] U.S. Cl. ........................... 340/471; 340/474; 340/475; 200/61.27; 200/61.38; 307/10.8
[58] Field of Search .................................. 340/471, 475, 340/468, 472, 474, 476, 477, 457; 200/61.27, 61.38; 307/10.8

[56] References Cited

U.S. PATENT DOCUMENTS

| 3,447,130 | 5/1969 | Skinner et al. | 340/475 |
| 3,710,049 | 1/1973 | Burgess et al. | 200/61.27 |
| 3,914,566 | 10/1975 | Wendling | 200/61.27 |
| 4,684,918 | 8/1987 | Solomon | 340/475 |
| 4,754,256 | 6/1988 | Fluhr et al. | 340/475 |
| 5,043,699 | 8/1991 | Hayden | 340/475 |
| 5,099,222 | 3/1992 | Campagna | 340/475 |
| 5,218,340 | 6/1993 | Shannon, Jr. et al. | 340/475 |
| 5,264,827 | 11/1993 | Giovanni | 340/477 |
| 5,438,314 | 8/1995 | Evans | 340/477 |
| 5,523,738 | 6/1996 | Fuller | 340/475 |

FOREIGN PATENT DOCUMENTS

| 64-90831 | 4/1989 | Japan. |
| 2-164629 | 6/1990 | Japan. |

*Primary Examiner*—Nina Tong
*Attorney, Agent, or Firm*—Rader, Fishman & Grauer; Ronald P. Kananen

[57] ABSTRACT

An electronic flasher system in which a first hazard switch is mounted on a combination switch body of a steering column together with a semiconductor switch and a flasher circuit, and a second hazard switch is mounted in a location where a person sitting on a seat other than a driver's seat can operate it. In one embodiment, an electric current detection resistor having a bimetal structure serving also as a sound source is connected to the semiconductor switch for flashing the direction indication lamps. The electric current detection resistor is welded to terminals on a module composed of the semiconductor switch and the flasher circuit, which module is mounted on the combination switch body. A protrusion is formed on the module to produce a striking sound by colliding with the electric current detection resistor. In another embodiment, the sound source is connected with the flasher circuit, and a blowing sound generated from the sound source is different in the turn signal flashing mode than in the hazard flashing mode, the blowing sound preferably being generated only in the turn signal flashing mode.

2 Claims, 2 Drawing Sheets

ELECTRONIC FLASHER SYSTEM

BACKGROUND OF THE INVENTION

1. Field of the Invention

The present invention relates generally to electronic flasher systems and, in particular, to an improved electronic flasher system wherein semiconductor switches are intermittently operated in response to operations of a turn signal switch and a hazard switch whereby a direction indication lamp can be selectively operated in a turn signal flashing mode and a hazard flashing mode.

2. Description of the Prior Art

Conventional electronic flasher systems are disclosed in Japanese Laid-Open Patent Publication Nos. SHO 64-90831 and HEI 2-164629. These conventional flasher systems include a semiconductor switch connected with a lamp, a flasher circuit for supplying an intermittent signal to the semiconductor switch, and a switch connected with the flasher circuit. These conventional flasher systems are adapted such that the semiconductor switch is intermittently actuated in response to the operation of the switch to flash the lamp. In such an electronic flasher system, no operation sound is produced from a semiconductor switch itself so that, as disclosed in Japanese Laid-Open Patent Publication No. SHO 55-87630, it is necessary to utilize a speaker of a car stereo or provide a buzzer exclusively for use with the electronic flasher system in order to generate an actuation sound tied to an operation state of the flasher system for checking flashing operation.

In these conventional electronic flasher systems, when the hazard switch is mounted on a combination switch body of a steering column together with the semiconductor switch and the flasher circuit, a driver can easily operate the hazard switch. However, it is difficult for a person on the passenger's seat and the like to reach the hazard switch. Accordingly, when a person on a seat other than the driver's seat tries to operate the hazard switch instead of the driver during an emergency, for example, the person cannot operate the hazard switch because he or she cannot reach the hazard switch.

In older mechanical flasher systems using relays and valve springs, an actuation sound of a switch is naturally produced, thereby making it easy to check flash operation. However, in an electronic flasher system of the type disclosed in the above mentioned references, no operation sound is produced from the semiconductor switch itself so that, as disclosed in Japanese Laid-Open Patent Publication No. SHO 55-87630, it is necessary to utilize a speaker of a car stereo or provide a buzzer exclusively for use with the electronic flasher system in order to produce an actuation sound tied to an actuation state of the flasher system.

In conventional mechanical flasher systems and electronic flasher systems, there is no difference between the flasher flashing mode and the hazard flashing mode, and an operation sound is generated the same with either flashing mode. Accordingly, in the hazard flashing mode, which is frequently used upon parking, for example, the operation sound acts as noise.

SUMMARY OF THE INVENTION

To solve the problems with the prior art systems described above, it is an object of the present invention to provide an electronic flasher system wherein even when the system is constructed by mounting a hazard switch on a combination switch body of a steering column together with the semiconductor switch and the flasher circuit, a person seated on a seat other than the driver's seat can operate the hazard switch during an emergency.

It is a further object of the present invention to provide an electronic flasher system for flashing a direction indication lamp with a semiconductor switch in which there is eliminated the need of exclusive component parts for producing an actuation sound.

It is a further object of the present invention to provide an electronic flasher system wherein an operation sound in the hazard flashing mode is prevented from acting as noise.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To solve the above objects, in accordance with a first aspect of the present invention, an electronic flasher system is provided which includes a semiconductor switch connected with a direction indication lamp of a vehicle, a flasher circuit for supplying an intermittent signal to the semiconductor switch, a turn signal switch and a plurality of hazard switches connected with the flasher circuit, wherein the semiconductor switch is intermittently operated in response to operations of the turn signal switch and the hazard switches to selectively operate the direction indication lamp in a turn signal flashing mode and a hazard flashing mode, the improvement being such that the hazard switches are constructed with a plurality of automatic return switches, and a first one of the hazard switches is mounted on a combination switch body of a steering column together with the semiconductor switch and the flasher circuit, and at least a second one of said hazard switches is mounted in a region where it can be operated by a person sitting on a seat other than a driver's seat.

The electronic flasher system according to this first aspect of the present invention preferably has a function wherein the operation is switched alternately to the hazard flashing mode and an OFF mode each time the flasher circuit is inputted an ON operation signal from the plurality of hazard switches. The electronic flasher of the present invention is also preferably adapted such that a module composed integrally of the semiconductor switch and the flasher circuit is mounted on the combination switch body.

In accordance with a second aspect of the present invention, an electronic flasher system is provided which includes a semiconductor switch connected with direction indication lamps of a vehicle, a flasher circuit for supplying an intermittent signal to the semiconductor switch, and a turn signal switch and a hazard switch connected with the flasher circuit, wherein the semiconductor switch is intermittently operated in response to operations of the turn signal switch and the hazard switch to selectively operate the direction indication lamps in a turn signal flashing mode and a hazard flashing mode, and wherein an electronic current detection resistor serving also as a sound source is connected with the semiconductor switch.

The electronic flasher according to this second aspect of the present invention is preferably adapted such that the electric current detection resistor serving also as a sound source is of a bimetal structure. The electric current detection resistor is preferably fixed to a terminal of a module composed of the semiconductor switch and the flasher circuit united integrally, and a protrusion is formed on the module to produce a striking sound by permitting the electric current detection resistor to collide therewith.

In accordance with a third aspect of the present invention, an electronic flasher system is provided which includes a semiconductor switch connected with direction indication lamps of a vehicle, a flasher circuit for supplying an intermittent signal to the semiconductor switch, and a turn signal switch and a hazard switch both connected with the flasher circuit, wherein the semiconductor switch is intermittently operated in response to operations of the turn signal switch and the hazard switch to selectively operate the direction indication lamps in a turn signal flashing mode and a hazard flashing mode, and wherein a sound source is connected with the flasher circuit, and a blowing sound of the sound source is different in the turn signal flashing mode than in the hazard flashing mode.

The electronic flasher according to this third aspect of the present invention is preferably adapted such that a sound volume of the blowing sound of the sound source is different in the turn signal flashing mode than in the hazard flashing mode. Alternatively, the blowing sound of the sound source is generated only in the turn signal flashing mode.

BRIEF DESCRIPTION OF THE DRAWINGS

The present invention will become more clearly appreciated as the disclosure of the invention is made with reference to the accompanying drawings. In the drawings.

DESCRIPTION OF THE PREFERRED EMBODIMENTS

Figure 1:
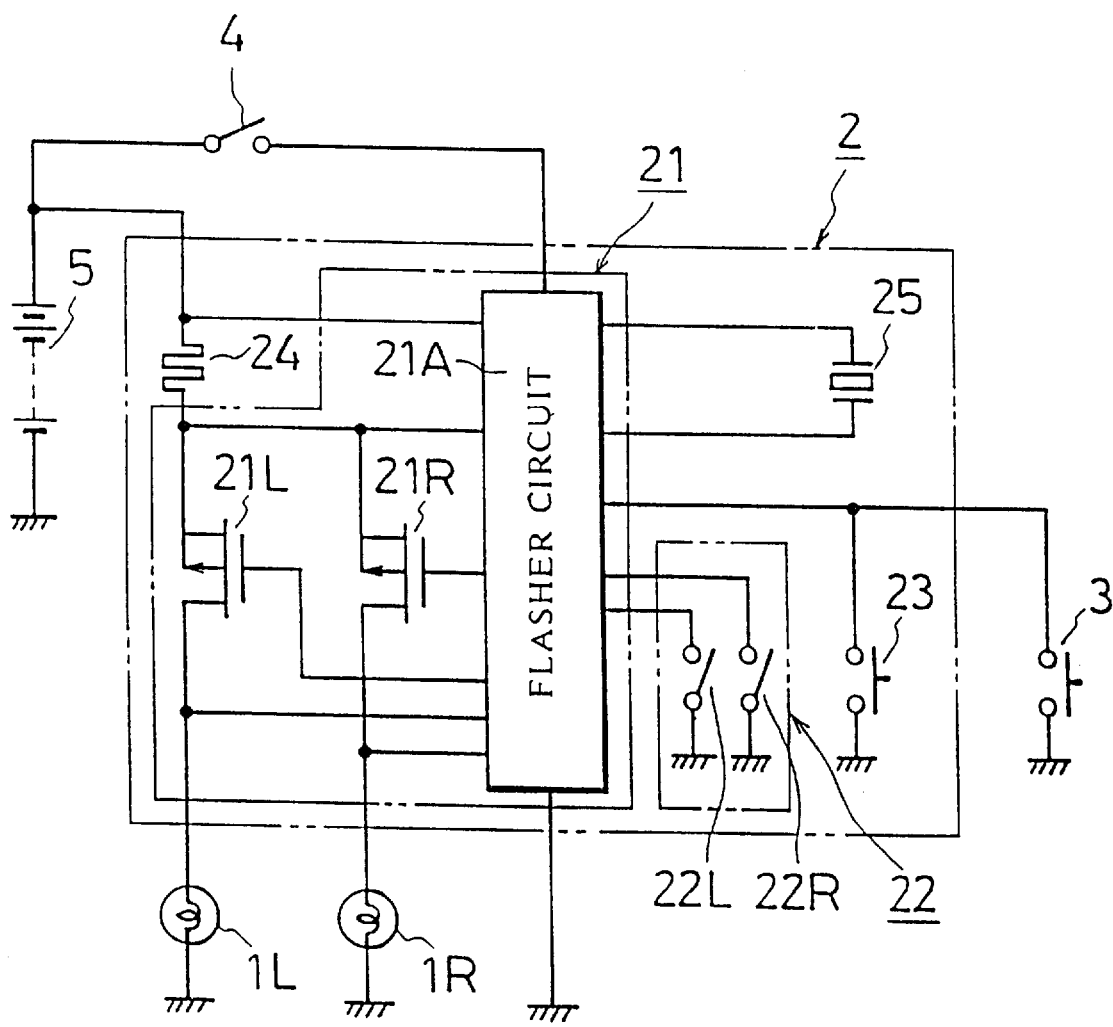
FIG. 1 is an electric circuit diagram illustrating a first embodiment of the present invention.

A first embodiment of the present invention will be described with reference to FIG. 1. Direction indication lamps 1R and 1L are provided on left and right sides of a vehicle body and are electrically connected with a combination switch body 2 provided on a steering column in the vehicle through a harness. The combination switch body 2 is an assembled switch composed of a variety of operation switches, such as a lighting system operation switch, a wiper system operation switch, a turn signal system operation switch, and so forth, and includes a flasher circuit 21A, semiconductor switches 21R, 21L, a turn signal switch 22, a hazard switch 23, an electric current detection resistor 24, and a sound source 25.

The flasher circuit 21A is a circuit for controlling the semiconductor switches 21R, 21L and the sound source 25 in response to the status of signals inputted from the turn signal switch 22, the hazard switches 23, 3, and the electric current detection resistor 24.

More specifically, the flasher circuit 21A has a function of outputting an intermittent signal to the right side semiconductor switch 21R by inputting an ON-operation signal from a right side contact 22R of the turn signal switch 22 to operate the right side direction indication lamp 1R in a turn signal flashing mode, as well as outputting an intermittent signal to the sound source 25 to generate a turn signal actuation sound, and a function of outputting an intermittent signal to the left side semiconductor switch 21L by inputting an ON-operation signal from a left side contact 22L of the turn signal switch 22 to operate the left side direction indication lamp 1L in a turn signal flashing mode, as well as outputting an intermittent signal to the sound source 25 to generate a turn signal actuation sound.

The flasher circuit 21A is alternately switched to a hazard flashing mode and an OFF mode each time the ON-operation signal is inputted from one of the hazard switches 23, 3. The flasher circuit 21A has a function in the hazard flashing mode wherein an intermittent signal is output to both of the semiconductor switches 21R, 21L to simultaneously flash (hazard flashing) the left and right direction indication lamps 1R, 1L, while in the OFF mode the flasher circuit 21A does not output the intermittent signal and, hence, puts out both lamps 1R, 1L. The flasher circuit 21A does not output the signal to the sound source 25 in either of the hazard flashing mode and the OFF mode and, hence, the sound source 25 does not generate an actuation sound.

The flasher circuit 21A further has a function of detecting voltage drop at both ends of the electric current detection circuit 24, and judges that the direction indication lamps 1R, 1L are disconnected when a level of the voltage drop is less than a predetermined level to alter the period of the intermittent signal outputted to the semiconductor switches 21R, 21L and, hence, alarm the disconnection.

The semiconductor switches 21R, 21L use a MOS FET and are united with the flasher circuit 21A to construct a module 21.

The turn signal switch 22 is a switch which is turned ON/OFF as a lever (not shown) provided on the combination switch body 2. The turn signal switch 22 is inclined and is composed of the right side contact 22R and the left side contact 22L. The hazard switch 23 is a switch constructed with automatic return switches, which is provided on the top end of the lever and on the upper part of the combination switch body 2. The electric current detection resistor 24 is constructed with a low resistor for obtaining voltage drop of about 100 mV proportional to a current flowing through the direction indication lamps 1R, 1L.

There are connected to the combination switch body 2 a hazard switch 3, an ignition switch 4, and a direct current power source 5. The hazard switch 3 is connected in parallel with the hazard switch 23 possessed by the combination switch body 2, and is mounted in a location where it can be operated by a person sitting on a seat other than the driver's seat. For example, the hazard switch 3 can be mounted in the vicinity of a center console.

An operation of the electronic flasher system according to the first embodiment will now be described. When the ignition switch 4 is in the ON-operation state, the flasher circuit 21A, once input with an ON-operation signal from the right side contact 22R of the turn signal switch 22, for example, outputs an intermittent signal to the right side semiconductor switch 21R to operate the right side direction indication lamp 1R in a turn signal flashing mode, and further outputs an intermittent signal to the sound source 25 to generate a turn signal actuation sound. The flasher circuit 21A, once input with an ON-operation signal from the left side contact 22L of the turn signal switch 22, outputs an intermittent signal to the left side semiconductor switch 21L to operate the left side direction indication lamp 1L in a turn signal flashing mode, and further outputs an intermittent signal to the sound source 25 to generate a turn signal actuation sound.

Once either of the hazard switches 23, 3 is turned ON, the flasher circuit 21A is placed in the hazard flashing mode, and hence outputs an intermittent signal to both of the semiconductor switches 21R, 21L to operate the left and right direction indication lamps 1R, 1L in the hazard flashing mode. Since no signal is outputted to the sound source 25 at this time, the sound source 25 remains silent. Once any of the hazard switches 23, 3 is again turned ON, the flasher circuit 21A is switched to an OFF-mode and hence both lamps 1R, 1L are put out.

The flasher circuit 21A controls the operation such that it detects voltage drop at both ends of the electric current detection resistor 24 in lighting timing where the direction indication lamps 1R, 1L are subject to the turn signal flashing or hazard flashing, and judges that the direction indication lamps 1R, 1L are disconnected when the level of the voltage drop becomes less than a predetermined level and alters the period of the intermittent signal outputted to the semiconductor switches 21R, 21L.

Figure 2:
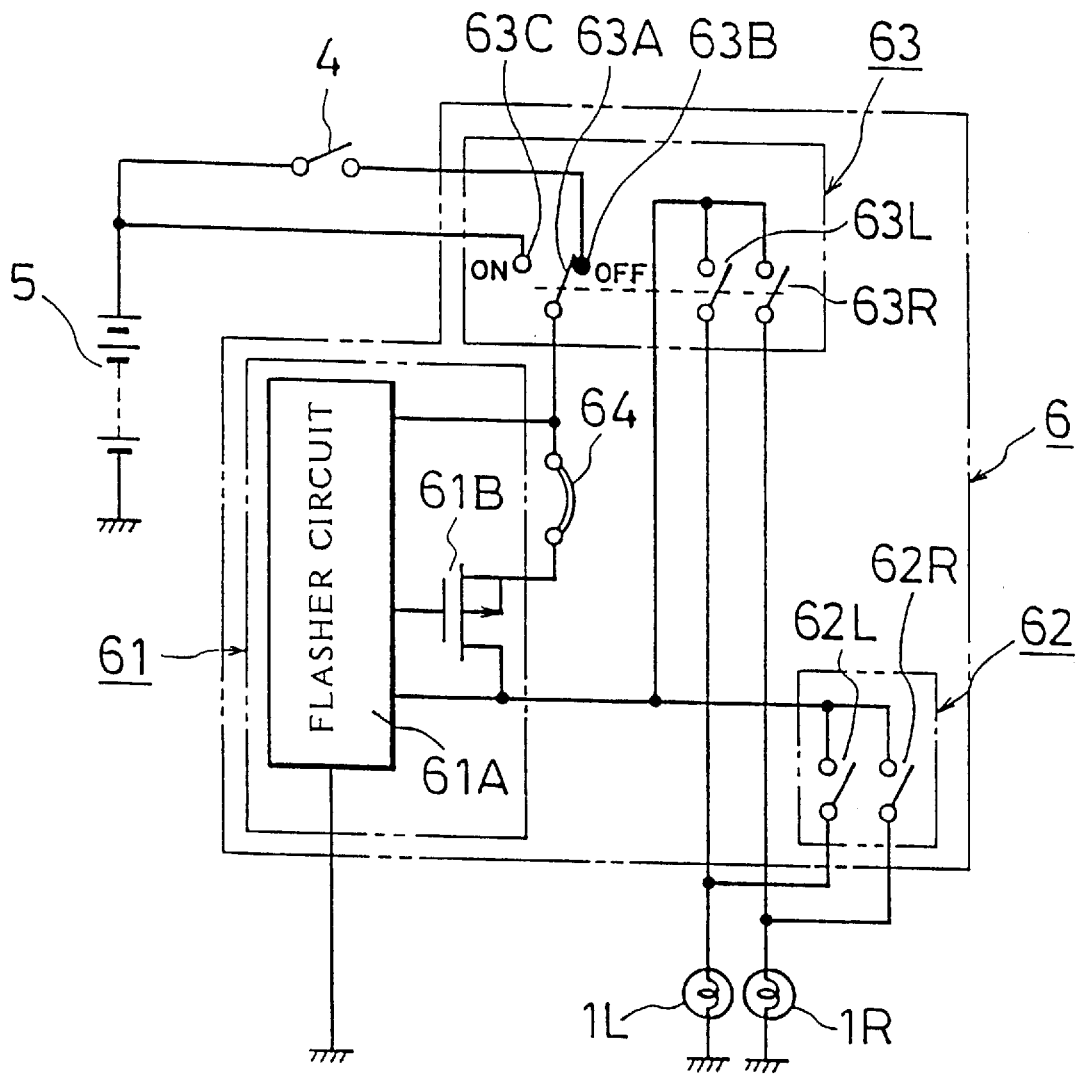
FIG. 2 is an electric circuit diagram illustrating a second embodiment of the present invention.

A second embodiment of the present invention will be described with reference to FIG. 2. Identical symbols are applied to parts identical to those described in the first embodiment, and the description of such parts is thereby omitted.

The combination switch body 6, like the combination switch body 2 in the first embodiment, is an assembly switch of various operation switches, such as a lighting system operation switch, a wiper system operation switch, and a turn signal system operation switch, and includes a flasher circuit 61A, a semiconductor switch 61B, a turn signal switch 62, a hazard switch 63, and an electric current detection resistor 64 serving also as the sound source.

The flasher circuit 61A is a circuit for controlling the semiconductor switch 61B in response to a status of signals inputted from the turn signal switch 62, the hazard switch 63, and the electric current detection resistor 64.

More specifically, the flasher circuit 61A has a function of outputting an intermittent signal to the semiconductor switch 61B by inputting an ON-operation signal from a right side contact 62R or a left side contact 62L of the turn signal switch 62.

The flasher circuit 61A is switched to a hazard flashing mode when receiving an ON-operation signal from the hazard switch 63 and is switched to an OFF mode when receiving an OFF-operation signal. The flasher circuit 61A has a function of outputting an intermittent signal to the semiconductor switch 61B to simultaneously render the left and right direction indication lamps 1R, 1L to hazard flashing in the hazard flashing mode, and of not outputting the intermittent signal to put out both lamps 1R, 1L in the OFF mode.

The flasher circuit 61A has a function of detecting voltage drop at both ends of the electric current detection resistor 64, and judging that the direction indication lamps 1R, 1L are disconnected when the level of the voltage drop is less than a predetermined level, and hence altering the period of the intermittent signal outputted to the semiconductor switch 61B to inform a user of the disconnection.

Figure 3A:
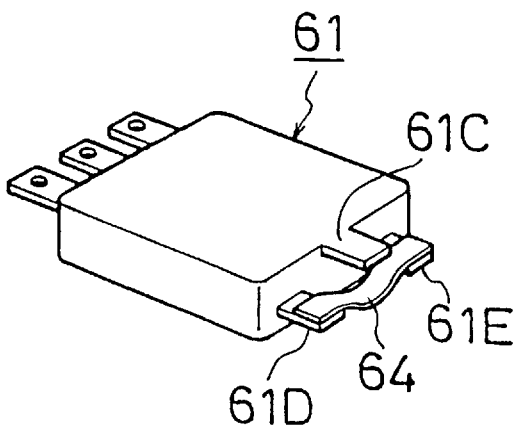
FIGS. 3(a) and 3(b) are perspective views illustrating the external appearance of a module shown in FIG. 2, with FIG. 3(a) showing the state where an electric current detection resistor is not heated, and FIG. 3(b) showing the state where the electric current detection resistor is heated and deformed to collide with a protrusion on the module.
Figure 3B:
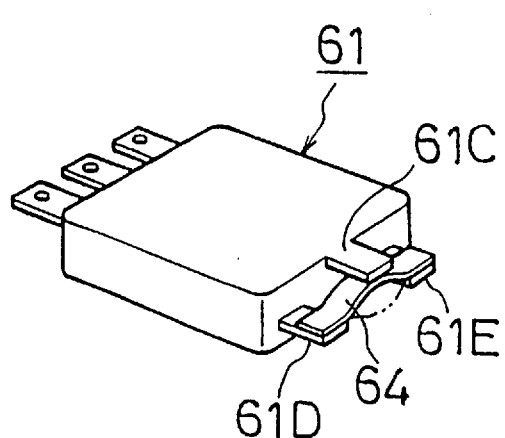

The semiconductor switch 61B uses a MOS FET, and is united with the flasher circuit 61A to form a module 61. The module 61 includes a protrusion 61C formed integrally therewith, as illustrated in FIGS. 3(*a*) and 3(*b*). Terminals 61D, 61E are protruded from the module 61 and are electrically connected therein with the semiconductor switch 61B and the flasher circuit 61A. The electric current detection resistor 64 described below is welded to the terminals 61D, 61E.

The turn signal switch 62 is a switch that is turned ON/OFF by inclining a lever (not shown) provided on the combination switch body 6, which is constructed with a right side contact 62R and a left side contact 62L. The hazard switch 63 is a switch that comprises a tumbler switch, for example. The hazard switch is provided on an instrument panel or the like and is constructed with a right side contact 63R, a left side contact 63L, a movable contact 63A, a normal close contact 63B, and a normal open contact 63C.

The electric current detection resistor 64 is constructed with a low resistance for obtaining voltage drop of about 100 mV proportional to currents flowing through the direction indication lamps 1R, 1L. More specifically, the electric current detection resistor 64 is formed of a bimetal structure in which metal plates having different thermal expansion coefficients are joined with each other in two layers, wherein a surface of the bimetal structure having the larger thermal expansion coefficient is directed to face the protrusion 61C and is bent away from the protrusion 61C and welded to the terminals 61D, 61E of the module 61, as illustrated in FIG. 3(*a*). Once the electric current detection resistor 64 is heated by an electric current flowing through the direction indication lamps 1R, 1L, the bend in the bimetal structure is reversed, as illustrated in FIG. 3(*b*), to collide with the protrusion 61C.

The operation of the electronic flasher system according to the second embodiment will now be described. When the ignition switch 4 is at an ON-operation state and the hazard switch 63 is at an OFF state, the flasher circuit 61A, once receiving an ON-operation signal of the right side contact 62R or the left side contact 62L from the turn signal switch 62, for example, outputs an intermittent signal to the semiconductor switch 61B. When the right side contact 62R is turned ON, the right side direction indication lamp 1R is rendered to turn signal flashing, while when the left side contact 62L is turned ON, the left side direction indication lamp 1L is rendered to turn signal flashing. At this time, the electric current detection resistor 64 is heated by a current flowing through the right side direction indication lamp 1R or the left side direction indication lamp 1L and deformed owing to the bimetal structure so that the electric current detection resistor 64 collides with the protrusion 61C of the module 61 in time with the light flashing to generate a striking sound.

Then, as the hazard switch 63 is turned ON, the right side and left side contacts 63R, 63L are turned ON, and simultaneously the movable contact 63A is connected with the normal open contact 63C. In this state, the flasher circuit 61A is operated in the hazard flashing mode whereby it outputs an intermittent signal to the semiconductor switch 61B to render the left and right direction indication lamps 1R, 1L to hazard flashing. When the hazard switch 63 is turned OFF, the flasher circuit 61A is switched to the OFF-mode to put out both lamps 1R, 1L.

The flasher circuit 61A controls the operation such that it detects voltage drop at both ends of the electric current detection resistor 64 serving also as the sound source in time with the light flashing when the direction indication lamps 1R, 1L are rendered to the turn signal flashing or hazard flashing. When the level of the voltage drop is less than a predetermined level, the flasher circuit 61A judges that the direction indication lamps 1R, 1L are disconnected and alters the period of the intermittent signal outputted to the semiconductor switch 61B.

According to the first aspect of the present invention, as described above, an electronic flasher system comprises a semiconductor switch connected with a direction indication lamp of a vehicle, a flasher circuit for supplying an intermittent signal to the semiconductor switch, and a turn signal switch and a plurality of hazard switches connected with the flasher circuit wherein the semiconductor switch is intermittently actuated in response to operations of the turn signal switch and the hazard switches to selectively operate the direction indication lamp in a turn signal flashing mode and a hazard flashing mode, the improvement being such that the hazard switch is constructed with a plurality of automatic return switches, and a first hazard switch is mounted on a combination switch body of a steering column together with the semiconductor switch and the flasher circuit and a second remaining hazard switch is mounted in a location where a person sitting on a seat other than a driver's seat can operate the second hazard switch, whereby even when the electronic flasher is constructed by mounting the hazard switch on the combination switch body of the steering column together with the semiconductor switch and the flasher circuit, a person sitting on another seat can operate the hazard switch instead of a driver during an emergency and so forth.

The flasher circuit has a function of alternately switching the operation to the hazard flashing mode and the OFF mode each time an ON-operation signal is input from the plurality of hazard switches whereby the flasher circuit can be freely switched to the hazard flashing mode and the OFF mode from either a driver's seat or another location.

The semiconductor switch and the flasher circuit are integrally united into a module whereby the module can be mounted on the combination switch body compactly.

According to the second aspect of the present invention, since the electric current detection resistor serving also as the sound source is connected with the semiconductor switch, there is eliminated the need for exclusive component parts for generating an actuation sound.

The electric current detection resistor serving also as the sound source is formed into a bimetal structure whereby the electric current detection resistor is self-heated each time a lamp current flows through the electric current detection resistor and is hence greatly deformed to easily generate a striking sound.

The electric current detection resistor is fixed to the terminal of the module composed of the semiconductor switch and the flasher circuit united integrally, and the protrusion with which the electric current detection resistor collides to generate a striking sound is formed on the module whereby the electric current detection resistor is not only easily supported but also the protrusion with which the electric current detection resistor collides is simply formed upon the formation of the module, and the module itself contributes to the generation of the striking sound.

According to the third aspect of the present invention, since a sound source is connected with the flasher circuit, and any blowing sound of the sound source is switched in the turn signal flashing mode and the hazard flashing mode, an operation sound in the hazard flashing mode can be prevented from becoming noise.

Provided the sound volume of the blowing sound of the sound source is switched in the turn signal flashing mode and the hazard flashing mode, in the hazard flashing mode, for example, the sound volume of the blowing sound of the sound source is not only reduced, but it can also be checked whether the operation is in the turn signal flashing mode or the hazard flashing mode by merely listening to the sound volume of the blowing sound.

Provided the blowing sound of the sound source is generated only in the turn signal flashing mode, an actuation sound in the hazard flashing mode is eliminated so that any noise is securely prevented from being produced by the sound source.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An electronic flasher system, comprising:

a semiconductor switch (61B) connected with direction indication lamps (1R, 1L) of a vehicle;

a flasher circuit (61A) for supplying an intermittent signal to said semiconductor switch (61B); and a turn signal switch (62) and a hazard switch (63) both connected with said flasher circuit (61A), said semiconductor switch (61B) being intermittently actuated in response to operations of said turn signal switch (62) and said hazard switch (63) to selectively operate said direction indication lamps (1R, 1L) in a turn signal flashing mode and a hazard flashing mode;

wherein said semiconductor switch (61B) and said flasher circuit (61A) are united integrally into a module (61), said module having a protrusion (61C) formed integrally therewith and a pair of terminals (61D, 61E) having end portions protruding from said module, an electric current detection resistor (64) serving as a sound source is connected with said semiconductor switch (61B) and said flasher circuit (61A) by being welded to said end portions of said pair of terminals (61D, 61E), said electric current detection resistor (64) being formed of a bimetal structure in which metal plates having different thermal expansion coefficients are joined with each other in two layers, and a surface of the bimetal structure having a larger thermal expansion coefficient is directed to face the protrusion (61C), said protrusion (61C) being arranged to collide with said current detection resistor (64) and generate a striking sound when an electric current flows through the direction indication lamps (1R, 1L), and said flasher circuit (61A) comprises means for detecting a voltage drop across said electric current detection resistor (64).

2. A electronic flasher system for a vehicle, comprising:

a plurality of direction indication lamps;

a module comprising a circuit of semiconductor switch elements in communication with said direction indication lamps, a protrusion formed integrally with the module, first and second terminals in electrical communication with said semiconductor switch elements, each of said terminals having end portions protruding from said module, and an electrical current detection resistor welded to said end portions of said terminals;

said electric current detection resistor being formed of a bimetal structure in which metal plates having different thermal expansion coefficients are joined with each other in two layers, and a surface of the bimetal structure having a larger thermal expansion coefficient is directed to face said protrusion, said protrusion being arranged to collide with said current detection resistor and generate a striking sound when an electric current flows through the direction indication lamps.

* * * * *